(12) United States Patent
Bonasia et al.

(10) Patent No.: US 7,440,246 B2
(45) Date of Patent: Oct. 21, 2008

(54) CIRCUIT INTERRUPTING APPARATUS WITH REMOTE TEST AND RESET ACTIVATION

(75) Inventors: Gaetano Bonasia, Bronx, NY (US); James Richter, Bethpage, NY (US); Steve Campolo, Malverne, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/234,185

(22) Filed: Sep. 26, 2005

(65) Prior Publication Data

US 2006/0152867 A1    Jul. 13, 2006

Related U.S. Application Data

(60) Provisional application No. 60/619,115, filed on Oct. 15, 2004.

(51) Int. Cl.
*H02H 3/00* (2006.01)
*H02H 9/08* (2006.01)

(52) U.S. Cl. .............. 361/42; 361/43; 361/44; 361/45; 361/46; 361/47; 361/48; 361/49; 361/50; 361/94

(58) Field of Classification Search ............. 361/42–50, 361/94
See application file for complete search history.

(56) References Cited

U.S. PATENT DOCUMENTS

| | | | |
|---|---|---|---|
| 4,138,684 A | 2/1979 | Kerr | |
| 4,334,171 A | 6/1982 | Parman et al. | |
| 4,578,732 A * | 3/1986 | Draper et al. | ........ 361/45 |
| 4,598,331 A | 7/1986 | Legatti | |
| 4,924,151 A | 5/1990 | D'Aleo et al. | |
| 4,939,792 A | 7/1990 | Urbish et al. | |
| 5,038,081 A | 8/1991 | Maiale, Jr. et al. | |
| 5,059,871 A | 10/1991 | Pearlman et al. | |
| 5,079,559 A | 1/1992 | Umetsu et al. | |
| 5,101,141 A | 3/1992 | Warner et al. | |
| 5,177,657 A | 1/1993 | Baer et al. | |
| 5,191,265 A | 3/1993 | D'Aleo et al. | |
| 5,225,765 A | 7/1993 | Callahan et al. | |
| 5,239,205 A | 8/1993 | Hoffman et al. | |
| 5,248,919 A | 9/1993 | Hanna et al. | |
| 5,319,301 A | 6/1994 | Callahan et al. | |
| 5,400,041 A | 3/1995 | Strickland | |
| 5,430,356 A | 7/1995 | Ference et al. | |
| 5,510,679 A | 4/1996 | Maiale, Jr. et al. | |
| 5,530,322 A | 6/1996 | Ference et al. | |
| 5,568,344 A | 10/1996 | Gernhardt et al. | |
| 5,680,287 A | 10/1997 | Gernhardt et al. | |
| 5,684,272 A | 11/1997 | Gernhardt et al. | |
| 5,712,450 A | 1/1998 | Chan et al. | |
| 5,736,965 A | 4/1998 | Mosebrook et al. | |
| 5,864,455 A | 1/1999 | Gernhardt et al. | |
| 5,867,127 A | 2/1999 | Black et al. | |
| 5,982,103 A | 11/1999 | Mosebrook et al. | |
| 6,046,550 A | 4/2000 | Ference et al. | |
| 6,091,205 A | 7/2000 | Newman, Jr. et al. | |
| 6,211,626 B1 | 4/2001 | Lys et al. | |

(Continued)

*Primary Examiner*—Michael J Sherry
*Assistant Examiner*—Dharti H Patel
(74) *Attorney, Agent, or Firm*—Collard & Roe, P.C.

(57) ABSTRACT

The present disclosure relates to resettable circuit interrupting devices and apparatus capable of being tested and reset from remote locations, and in particular to portable circuit interrupting devices and apparatus capable of being tested and reset from remote locations.

20 Claims, 6 Drawing Sheets

U.S. PATENT DOCUMENTS

| | | |
|---|---|---|
| 6,215,102 B1 * | 4/2001 | Jones .................. 219/213 |
| 6,297,724 B1 | 10/2001 | Bryans et al. |
| 6,340,868 B1 | 1/2002 | Lys et al. |
| 6,347,028 B1 | 2/2002 | Hausman, Jr. et al. |
| 6,369,524 B1 | 4/2002 | Sid |
| 6,380,692 B1 | 4/2002 | Newman, Jr. et al. |
| 6,381,113 B1 * | 4/2002 | Legatti .................. 361/46 |
| 6,459,919 B1 | 10/2002 | Lys et al. |
| 6,469,547 B1 | 10/2002 | Rabii |
| 6,507,158 B1 | 1/2003 | Wang |
| 6,528,957 B1 | 3/2003 | Luchaco |
| 6,761,470 B2 | 7/2004 | Sid |
| 6,798,341 B1 | 9/2004 | Eckel et al. |
| 6,897,783 B2 * | 5/2005 | Zeng et al. .................. 340/635 |
| 6,901,439 B1 | 5/2005 | Bonasia et al. |
| 6,917,167 B2 | 7/2005 | Courtney et al. |
| D519,937 S | 5/2006 | Laurent et al. |
| D519,938 S | 5/2006 | Laurent et al. |
| D520,961 S | 5/2006 | Laurent et al. |
| D521,457 S | 5/2006 | Laurent et al. |
| 7,038,910 B1 | 5/2006 | Hodge et al. |
| 7,071,634 B2 | 7/2006 | Johnson et al. |
| 7,106,261 B2 | 9/2006 | Nagel et al. |
| 7,164,238 B2 | 1/2007 | Kazanov et al. |
| 7,166,970 B2 | 1/2007 | Johnson et al. |
| 7,219,141 B2 | 5/2007 | Bonasia et al. |
| 2001/0015862 A1 | 8/2001 | Lynam et al. |
| 2003/0076281 A1 | 4/2003 | Morgan et al. |
| 2003/0233129 A1 | 12/2003 | Matos |
| 2004/0002792 A1 | 1/2004 | Hoffknecht |
| 2004/0212324 A1 | 10/2004 | Callahan |
| 2005/0025496 A1 | 2/2005 | Akita et al. |
| 2005/0043907 A1 | 2/2005 | Eckel et al. |
| 2005/0125083 A1 | 6/2005 | Kiko |
| 2005/0248300 A1 | 11/2005 | Walko, Jr. et al. |
| 2005/0280598 A1 | 12/2005 | Webb et al. |
| 2006/0049935 A1 | 3/2006 | Giannopoulos et al. |
| 2006/0279236 A1 | 12/2006 | Johnson et al. |
| 2007/0162536 A1 | 7/2007 | Ostrovsky et al. |

* cited by examiner

CIRCUIT INTERRUPTING APPARATUS WITH REMOTE TEST AND RESET ACTIVATION

CROSS REFERENCE TO RELATED APPLICATIONS

This application is related to and claims priority of U.S. Provisional Patent Application No. 60/619,115, filed Oct. 15, 2004, and entitled "Ground Fault Circuit Interrupter With Remote Test and Reset," which application is incorporated herein in its entirety by reference.

BACKGROUND

1. Field

The present disclosure relates to resettable circuit interrupting devices and assemblies capable of being tested and reset from remote locations, and include without limitation ground fault circuit interrupters (GFCI's), arc fault circuit interrupters (AFCI's), immersion detection circuit interrupters (IDCI's), appliance leakage circuit interrupters (ALCI's), and equipment leakage circuit interrupters (ELCI's),

2. Description of the Related Art

Many electrical wiring devices have a line side, which is connectable to an electrical power supply, and a load side, which is connectable to one or more loads and at least one conductive path between the line and load sides, or a cable between the line side and the load side. The electrical wiring device industry has witnessed an increasing call for circuit breaking devices or systems which are designed to interrupt power to various loads, such as household or industrial appliances, and consumer electrical products. In particular, electrical codes require electrical circuits in home bathrooms and kitchens to be equipped with ground fault circuit interrupters (GFCI), for example. Presently available GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

A proposal has been introduced to the National Electric Code (NEC) Section 422.16(B)(4) that would require new and remanufactured vending machines to have installed at the factory a power cord or cable assembly that includes a ground fault type circuit interrupting device. In a typical environment where a vending machine is located, a cable assembly with a ground fault type circuit interrupting device would be located in the rear of the vending machine and plugged into a wall outlet typically behind the vending machine. To test the ground fault type circuit interrupting device, the vending machine would have to be moved away from the wall to gain access to the circuit interrupting device. Since vending machines are typically heavy and the location of the wall outlet and rear cable assembly make it difficult and inconvenient to perform periodic testing of the ground fault type circuit interrupting device. Moreover, Underwriters' Laboratories (UL) has issued a requirement for periodic and convenient testing of ground fault type circuit interrupting devices.

SUMMARY

The present disclosure relates to resettable circuit interrupting devices and apparatus capable of being tested and reset from remote locations, and in particular to portable circuit interrupting devices and apparatus that are capable of being tested and reset from remote locations. In one embodiment, the portable circuit interrupting apparatus includes a plug assembly, a connector, and a circuit interrupting device located between the plug assembly and connector. The circuit interrupting device can be connected to the plug assembly and connector by one or more cables, and is configured to change from a reset state to a trip state upon the occurrence of a predetermined condition, such as a ground fault. The circuit interrupting device also includes test circuitry configured to cause the circuit interrupting device to change from the reset state to the trip state when activated, and reset circuitry configured to cause the circuit interrupting device to change from the tripped state to the reset state when activated. At least one activating device is provided to remotely activate the test circuitry or the reset circuitry. The activating device may be a wireless device that activates the test circuitry or the reset circuitry by transmitting a wireless signal to the circuit interrupting device, or the activating device may be hard wired to the circuit interrupting device and activates the test circuitry or the reset circuitry by sending a signal along the hard wire to the circuit interrupting device. The activating device may be included in the connector or a stand alone device.

In an alternative embodiment, the portable circuit interrupting apparatus includes a plug assembly, a circuit interrupting device connected to the plug assembly and at least one activating device operatively coupled to the circuit interrupting device. The circuit interrupting device is preferably configured to change from a reset state to a trip state upon the occurrence of a predetermined condition, such as a ground fault. The circuit interrupting device includes test circuitry configured to cause the circuit interrupting device to change from the reset state to the trip state when activated, and reset circuitry configured to cause the circuit interrupting device to change from the tripped state to the reset state when activated. At least one activating device is provided to remotely activate the test circuitry or the reset circuitry. The activating device may be a wireless device that activates the test circuitry or the reset circuitry by transmitting a wireless signal to the circuit interrupting device, or the activating device may be hard wired to the circuit interrupting device and activates the test circuitry or the reset circuitry by sending a signal along the hard wire to the circuit interrupting device.

In another embodiment, the portable circuit interrupting apparatus includes a plug assembly having a circuit interrupting device included in the plug assembly, and at least one activating device capable of remotely activating the test circuitry or reset circuitry.

BRIEF DESCRIPTION OF THE DRAWINGS

FIG. 7 is a cross-sectional view of a cable for use with a GFCI with remote test and reset functionality in accordance with another embodiment of the

DETAILED DESCRIPTION

Figure 1:
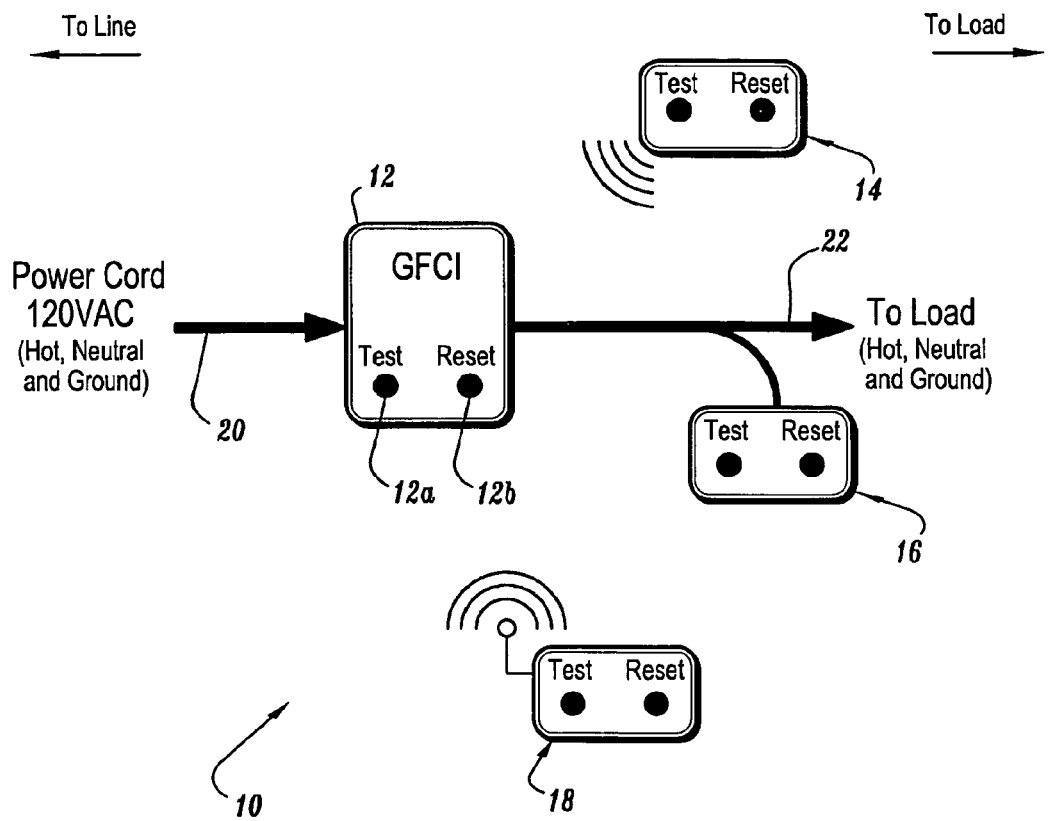
FIG. 1 is a block diagram of a GFCI with remote test and reset functionality in accordance with an embodiment of the present disclosure.

As noted, the present disclosure relates to resettable circuit interrupting devices and assemblies capable of being tested and reset from remote locations and in particular to portable circuit interrupting apparatus capable of being tested and reset from remote locations. The type of circuit interrupting devices contemplated by the present disclosure include without limitation ground fault type circuit interrupting devices, arc fault circuit interrupting devices, immersion detection circuit interrupting devices, appliance leakage circuit interrupting devices, and equipment leakage circuit interrupting devices. However, for ease of description and without departing from the full scope of the family of circuit interrupting devices, the following description will be directed to ground fault circuit interrupting devices. Referring to FIG. 1, a portable circuit interrupting apparatus 10 with remote test and reset functionality in accordance with one embodiment of the present disclosure is provided. The portable circuit interrupting apparatus 10 can be a power cord assembly, a cable assembly or any other portable structure capable of supplying power from a fixed power source to a load, such as a commercial, industrial or home appliance.

In the embodiment of FIG. 1, the circuit interrupting apparatus 10 includes a ground fault type circuit interrupting device 12 and activating devices 14, 16 or 18. While FIG. 1 illustrates multiple activating devices, one or more of the activating devices 14, 16 or 18 can be included in the circuit interrupting assembly 10. The circuit interrupting device 12 has a line side portion that includes a power cord or cable 20 having a plug assembly for connection to a fixed source of electrical power, e.g., a wall mounted outlet (not shown), for providing electrical power to a load. The circuit interrupting device 12 has a load side that includes a load side power cord or cable 22 with electrical power conductors ending in a connector (e.g., a male or female receptacle, not shown) that connects to an electrical load (not shown), such as a vending machine or other commercial, industrial or home electrical machine. Between the line side and load side of the circuit interrupting device are conductive paths. Typically, there is a phase conductive path and a neutral conductive path and a ground conductive path. The cable 20 and plug assembly and the connector are standard electrical components for handling electrical power over phase, neutral and ground conductors. The circuit interrupting device 12 also includes fault sensing circuitry used to monitor the electrical power flowing through the line side phase and neutral conductive paths of cable 20, and a trip mechanism used to change the state of the circuit interrupting device between a reset state and a tripped state. In the reset state there is electrical continuity in the phase and neutral conductive paths between the line side and load side of the circuit interrupting device 12. In the tripped state there is electrical discontinuity in the phase and neutral conductive paths between the line side and load side of the circuit interrupting device 12. When a fault condition is detected by the fault sensing circuitry the trip mechanism causes the circuit interrupting device to change from the reset state to the tripped state. Examples of fault conditions the fault sensing circuitry may detect include ground faults, arc faults, appliance leakage faults, immersion detection faults, or equipment leakage faults. The trip mechanism may utilize electromechanical or electrical components or both to change the state of the circuit interrupting device 12. That is, the trip mechanism may use electromechanical or electrical components or both to cause electrical discontinuity in the phase and neutral conductive paths between the line side and load side of the circuit interrupting device (the tripped state), or the trip mechanism may use electro-mechanical or electrical components or both to cause electrical continuity in the phase and neutral conductive paths between the line side and load side of the circuit interrupting device (the reset state). An example of the fault sensing circuitry and the trip mechanism can be found in commonly owned U.S. Pat. No. 4,595,894, which is incorporated herein in its entirety by reference.

The circuit interrupting device 12 also includes test circuitry and reset circuitry that can be manually activated by buttons 12a, 12b or remotely activated as will be described below. The test circuitry is used to test all or part of the fault sensing circuitry, the trip mechanism, or both the fault sensing circuitry and the trip mechanism of the circuit interrupting device 12. The reset circuitry is used to cause the trip mechanism to return to the reset state, i.e., to re-establish electrical continuity in the phase and neutral conductive paths after the circuit interrupting device 12 has been tested or a fault condition detected. Examples of the test circuitry and the reset circuitry can be found in commonly owned U.S. Pat. No. 4,595,894. It should be noted that the circuit interrupting device may also include reset lockout funtionality to prevent the circuit interrupting device from changing to the reset state in the event all or part of the fault sensing circuitry, all or part of the trip mechanism or all or part of the test circuitry are inoperative. Examples of reset lockout features are described in commonly owned U.S. Pat. No. 6,282,070, which is incorporated herein in its entirety by reference.

For remote activation of the test circuitry or the reset circuitry the circuit interrupting device may be configured for hard wire communications to the one or more activating devices 14, 16 or 18 via additional conductors in cable 22. In addition to or instead of hard wire communication, the circuit interrupting device may include wireless communication circuitry connected to the test circuitry and the reset circuitry. The communication circuitry enables remote activation of all or part of the test circuitry, all or part of the reset circuitry, or all or part of the test and reset circuitry. The wireless communication circuitry contemplated by the present disclosure covers the complete spectrum of wireless communication circuits including infra-red communication circuitry, radio frequency communication circuitry, or any other technique for wireless communications. Typically, the communication circuitry includes a receiver for receiving wireless signals and adapter circuitry for adapting the received wireless signal to a form capable of communicating with the test circuitry or the reset circuitry.

As noted the test and reset circuitry of the circuit interrupting device 12 can be remotely activated by one or more activating devices 14, 16 or 18. The activating devices 14, 16 or 18 include user accessible buttons (e.g., test and/or reset buttons) to remotely activate the test circuitry or reset circuitry of the circuit interrupting device 12. As noted, various communication techniques may be utilized. For example, as seen in FIG. 1, activating device 16 is hard wired to the circuit interrupting device 12 via cable 22. Activating device 14 uses infra-red (IR) communications and activating device 18 uses radio frequency (RF) communications. Both the activating device 14 and activating device 18 would typically include a transmitter for transmitting a test or rest signal generated when either the test or reset button is activated.

Although three activating devices have been shown it should be understood that the number and type of activating devices can vary depending on the application. Moreover, an activating device can use various communication techniques to activate the test circuitry or reset circuitry of the circuit interrupting device 12, such as, for example, power-line-carrier, twisted pair, fiber optic, light or wave guide, natural or artificial light, magnetic or electrical means or other techniques.

Figure 2:
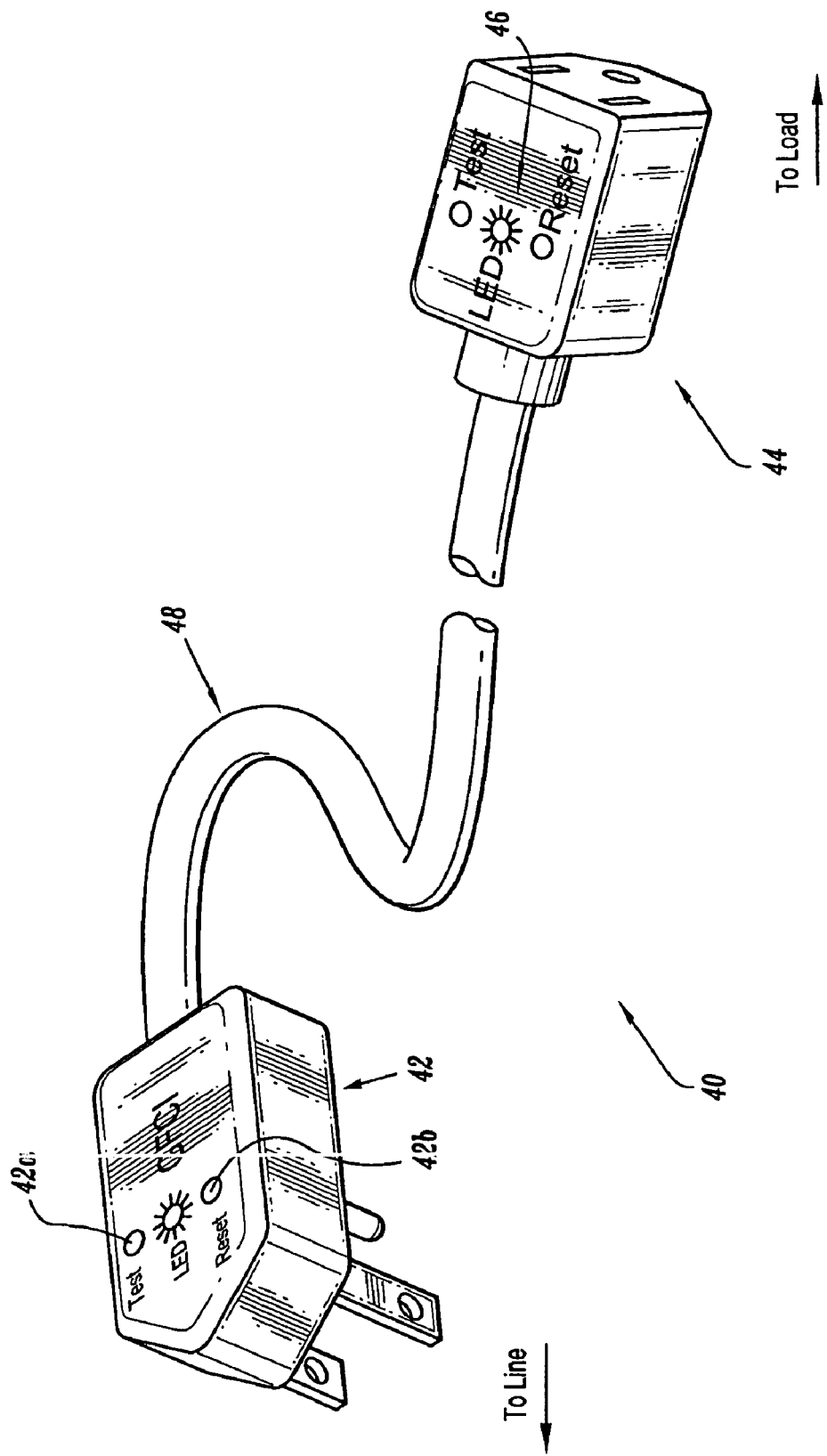
FIG. 2 is a diagram of a GFCI with remote test and reset functionality in accordance with another embodiment of the present disclosure.

FIG. 2 illustrates another embodiment of a portable circuit interrupting apparatus 40 with remote test and reset functionality. In the embodiment of FIG. 2, the circuit interrupting device described above is included in a plug assembly 42 capable of connecting to a fixed source of electrical power, e.g., a wall mounted outlet (not shown), to provide electrical power to a load. The plug assembly 42 has a power cord or cable 48 ending in a connector 44 (e.g., a male or female receptacle) for connection to an electrical load, such as a vending machine or other commercial, industrial or home electrical machine (not shown). In this embodiment, plug assembly 42 includes a line side that has prongs for connecting to the fixed source of electrical power and a load side connected to the power conductors in cable 48. Conductive paths are provided between the line side and load side of the plug assembly. The circuit interrupting device is connected between the line side and load side of the plug assembly 42.

As noted, between the line side and load side of the plug assembly 42 are conductive paths. Typically, there is a phase conductive path and a neutral conductive path and a ground conductive path. The circuit interrupting device includes fault sensing circuitry used to monitor the electrical power flowing through the phase and neutral conductive paths on the line side of the plug assembly 42, and a trip mechanism used to change the state of the circuit interrupting device between a reset state and a tripped state. In the reset state there is electrical continuity in the phase and neutral conductive paths between the line side and load side of the plug assembly 42. In the tripped state there is electrical discontinuity in the phase and neutral conductive paths between the line side and load side of the plug assembly 42. When a fault condition is detected by the fault sensing circuitry the trip mechanism causes the circuit interrupting device to change from the reset state to the tripped state. Examples of the fault conditions the fault sensing circuitry may detect include ground faults, arc faults, appliance leakage faults, immersion detection faults, or equipment leakage faults. The trip mechanism may include electromechanical or electrical components or both to change the state of the circuit interrupting device. That is, the trip mechanism may use electromechanical or electrical components or both to cause electrical discontinuity in the phase and neutral conductive paths between the line side and load side of the circuit interrupting device (the tripped state), or the trip mechanism may use electromechanical or electrical components or both to cause electrical continuity in the phase and neutral conductive paths between the line side and load side of the circuit interrupting device (the reset state).

The circuit interrupting device also includes test circuitry and reset circuitry that can be manually activated by buttons 42a, 42b or remotely activated as will be described below. The test circuitry is used to test all or part of the fault sensing circuitry, the trip mechanism or both the fault sensing circuitry and trip mechanism of the circuit interrupting device. The reset circuitry is to cause the trip mechanism to return to the reset state, i.e., to re-establish electrical continuity in the phase and neutral conductive paths, after the circuit interrupting device has been tested or a fault condition detected. Examples of the test circuitry and reset circuitry can be found in commonly owned U.S. Pat. No. 4,595,894. It should be noted that the circuit interrupting device may also include reset lockout functionality to prevent the circuit interrupting device from changing to the reset state in the event all or part of the fault sensing circuitry, all or part of the trip mechanism or all or part of the test circuitry are inoperative. Examples of reset lockout features are described in commonly owned U.S. Pat. No. 6,282,070.

In the embodiment of FIG. 2, the connector 44 includes activating device 46 having test and reset buttons 46a, 46b which can be used to remotely activate all or part of the test circuitry, all or part of the reset circuitry or all or part of both. The cable 48 includes power conductors and signal conductors. The power conductors deliver electrical power from the plug assembly 42 to the connector 44. At the plug assembly 42, the signal conductors are connected to the test circuitry and reset circuitry, and at the connector 44 the signal conductors are connected to test and reset buttons 46a, 46b on activating device 46. The signal conductors are used by the activating device 46 to communicate with and remotely activate all or part of the test circuitry, all or part of the reset circuitry or all or part of both.

Figure 3:
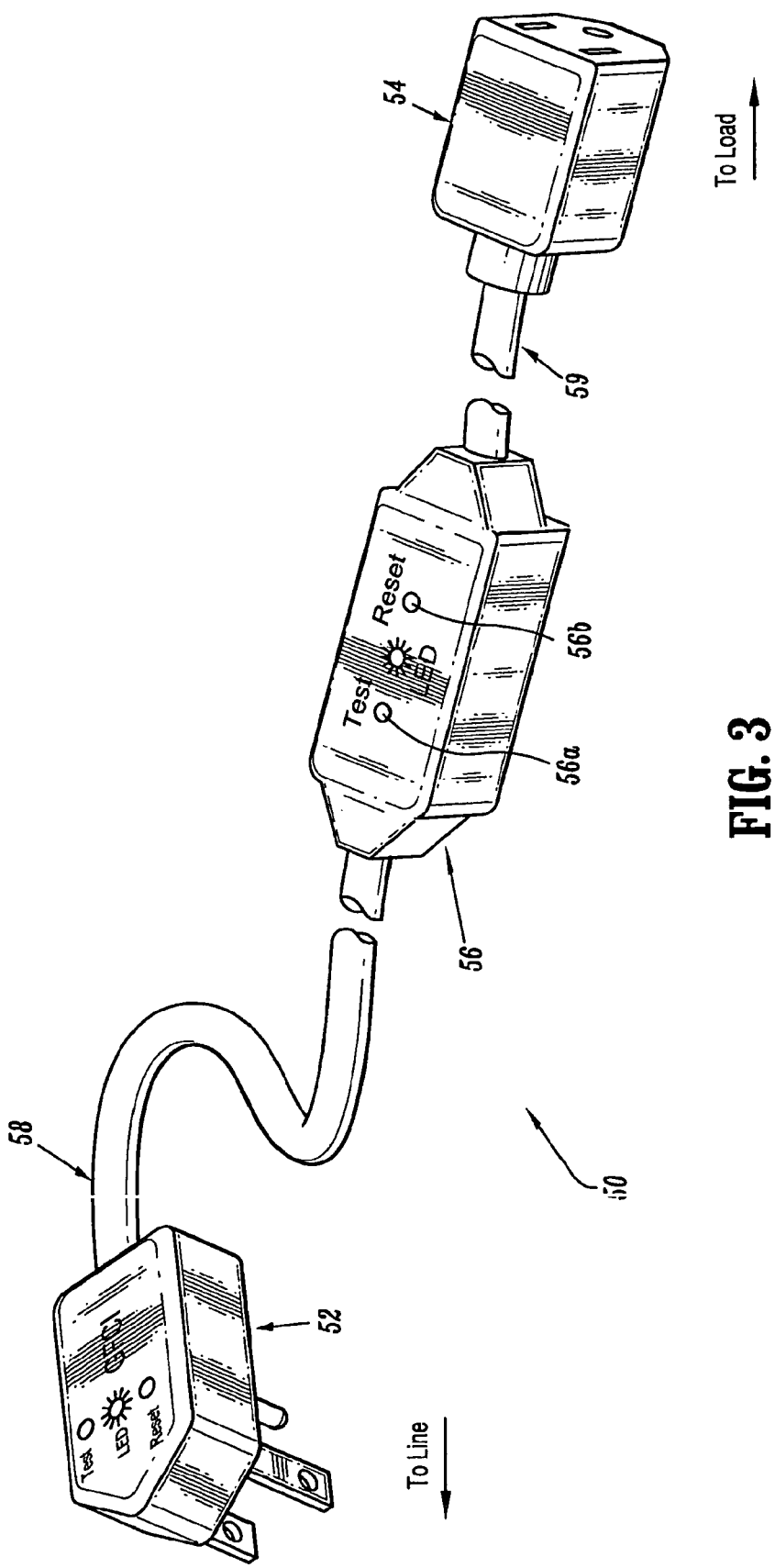
FIG. 3 is a diagram of a GFCI with remote test and reset functionality in accordance with another embodiment of the present disclosure.

FIG. 3 illustrates another embodiment of a portable circuit interrupting apparatus 50 with remote test and reset functionality. In this embodiment, the plug assembly 52 is substantially similar to plug assembly 42 and for clarity will not be described further. The remote activation of the test or reset circuitry in the circuit interrupting device is provided by an inline activating device 56 disposed between the plug assembly 52 and connector 54. The activating device 56 includes test and reset buttons 56a, 56b which can be used to remotely activate all or part of the test circuitry, all or part of the reset circuitry or all or part of both. The plug assembly 52 is connected to the activating device 56 via cable 58 and connector 54 is connected to the activating device via cable 59. Cable 58 has power conductors and signal conductors. Cable 59 has power conductors. The power conductors deliver power from the plug assembly 52 to the connector 54. The signal conductors in cable 58 are used by the activating device 56 to communicate with and remotely activate all or part of the test circuitry, all or part of the reset circuitry or all or part of both.

Figure 4:
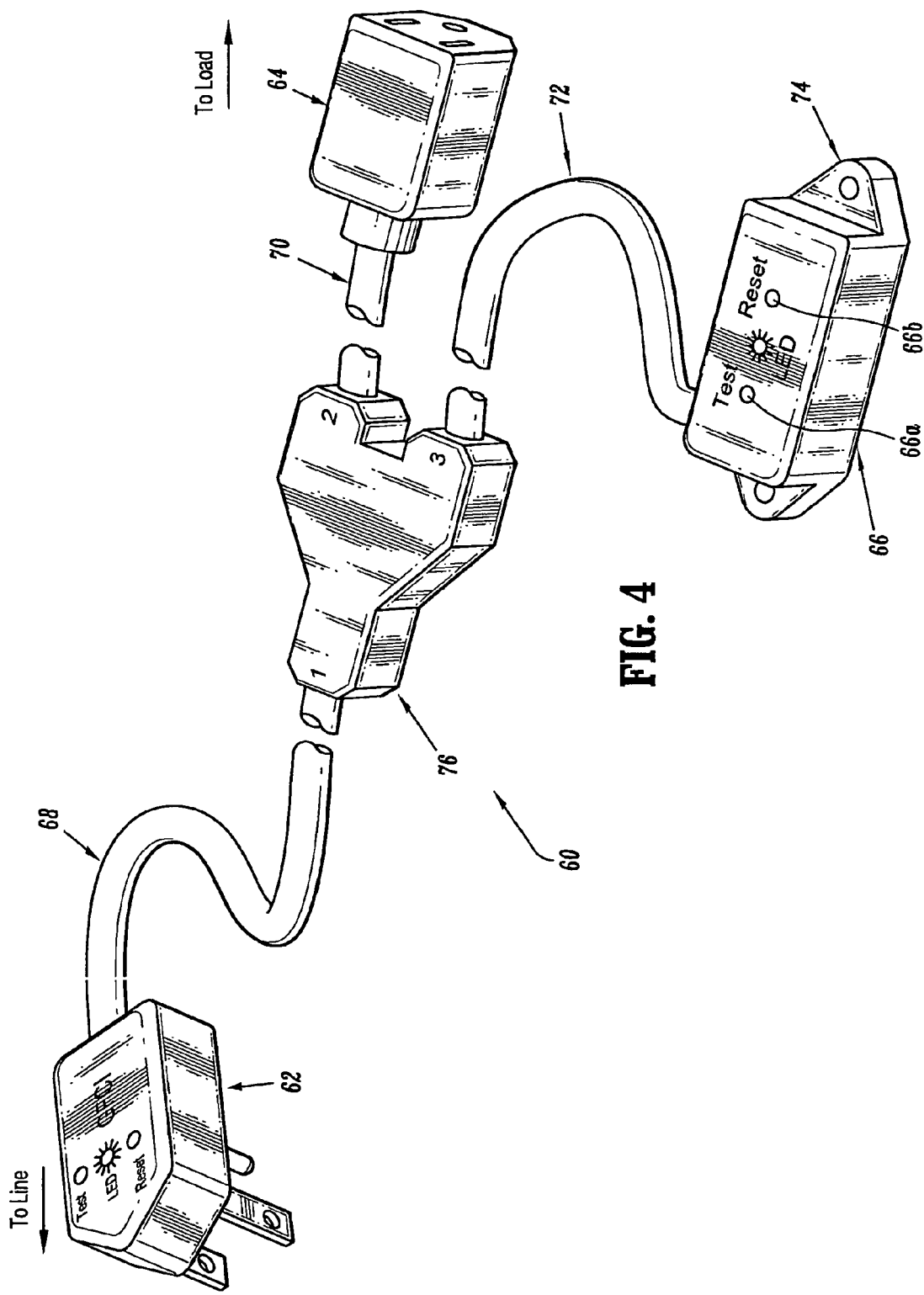
FIG. 4 is a diagram of a GFCI with remote test and reset functionality in accordance with another embodiment of the present disclosure.

FIG. 4 illustrates another embodiment of a portable circuit interrupting apparatus 60 with remote test and reset functionality. In this embodiment, the plug assembly 62 is substantially similar to plug assembly 42 described above and for clarity will not be described further, and the remote test and reset functionality is provided by activating device 66. The activating device 66 includes test and reset buttons 66a, 66b which can be used to remotely activate all or part of the test circuitry, all or part of the reset circuitry or all or part of both. The activating device may be free standing or may be fixed to, for example, a wall via eyelets 74. In this embodiment, the plug assembly 62 is connected to a first port of a splitter 76 via cable 68. Cable 68 has power conductors and signal conductors. A cable 70 having power conductors is connected between the connector 64 and a second port of the splitter 76. A third port of splitter 76 is connected to the activating device 66 via cable 72. Cable 72 has signal conductors. The power conductors deliver electrical power from the plug assembly 62 to the connector 64. The signal conductors in cable 68 and 72 are used by the activating device 66 to communicate with and remotely activate all or part of the test circuitry, all or part of the reset circuitry or all or part of both in the circuit interrupting device.

Figure 5:
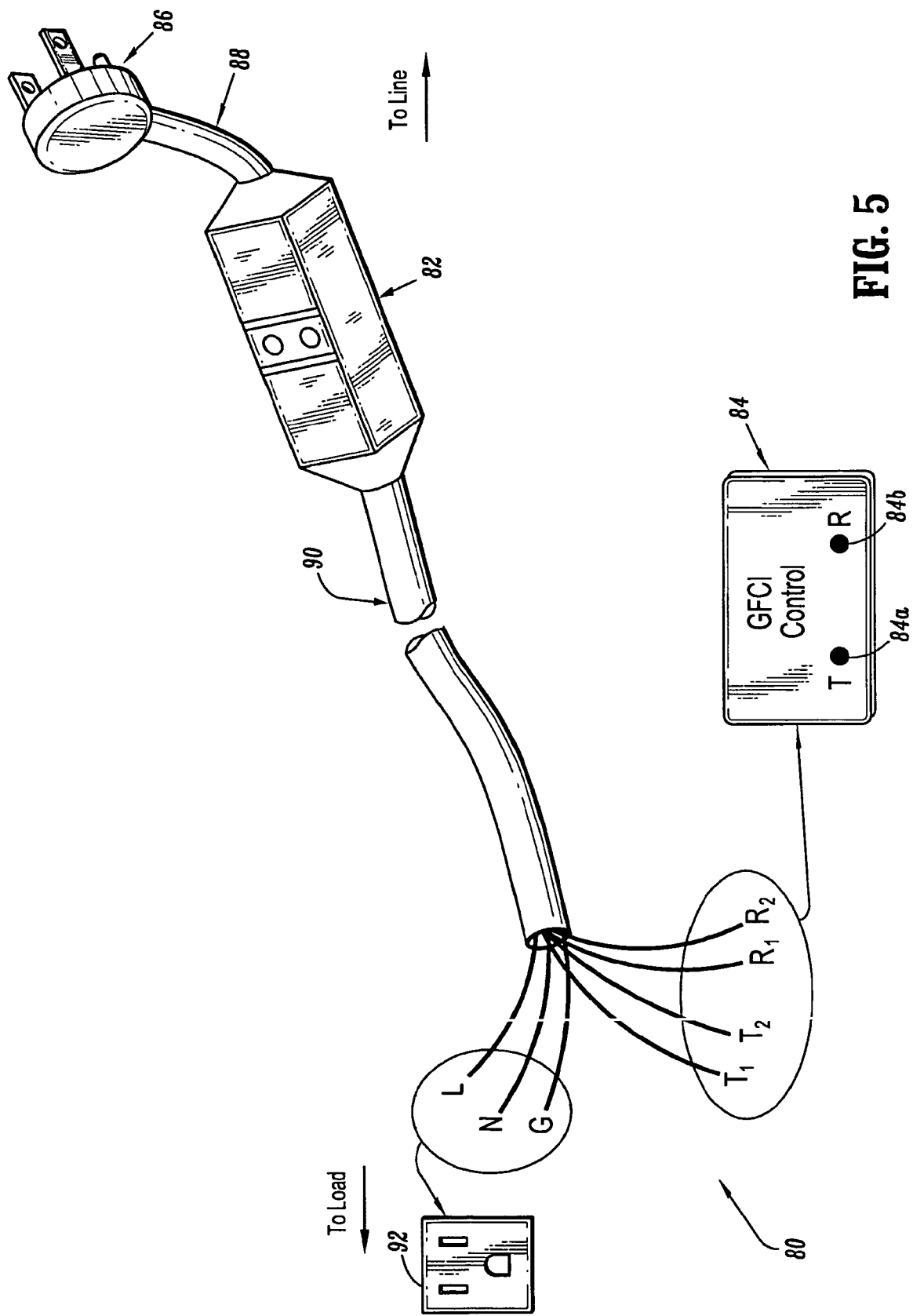
FIG. 5 is a diagram of a GFCI with remote test and reset functionality in accordance with another embodiment of the present disclosure.

FIG. 5 illustrates another embodiment of a portable circuit interrupting apparatus 80 with remote test and reset functionality. In this embodiment, the remote test and reset functionality is provided by activating device 84 connected to the load side of circuit interrupting device 82 through cable 90. The line side of the circuit interrupting device is connected via cable 88 to a plug assembly 86. The plug assembly 86 is used to connect the circuit interrupting assembly 82 to a fixed source of electrical power, e.g., a wall mounted outlet (not shown), to provide electrical power to a load (not shown), such as a vending machine or other commercial, industrial or home electrical machine. The circuit interrupting device is substantially similar to the circuit interrupting device 12 described above and for clarity will not be described further.

The activating device 84 includes test and reset buttons 84a, 84b which can be used to remotely activate all or part of the test circuitry, all or part of the reset circuitry or all or part of both. The activating device 84 may be configured as a panel capable of being mounted to a surface of an object, such as wall or a machine.

As noted, the load side of the circuit interrupting device 82 is connected to the activating device 84 via cable 90. Cable 90 includes power conductors (Phase (L), Neutral (N) and Ground (G)) and signal conductors (T1, T2, R1, R2). The power conductors provide power to a load, the signal conductors T1, T2 are connected to the test button 84a, and the signal conductors R1, R2 are connected to reset button 84b.

Figure 6:
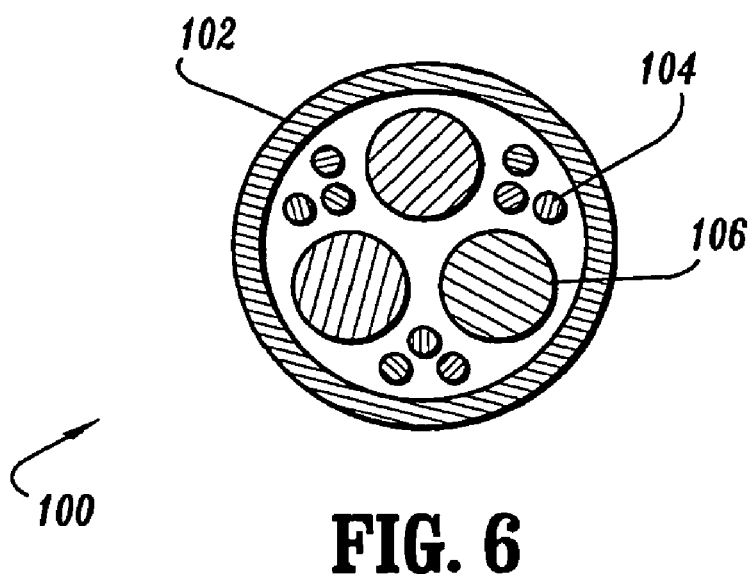
FIG. 6 is a cross-sectional view of a cable for use with a GFCI with remote test and reset functionality in accordance with an embodiment of the present disclosure.

FIG. 6 is a cross-sectional view of a cable 100 that may be used with the various embodiments of a portable circuit interrupting apparatus. The cable 100 includes an outer sheathing 102 having three power conductors 106 and three pairs of signal conductors 104. The power conductors 106 are used to carry electrical power over standard power lines (Phase, Neutral and Ground). Each pair of the signal conductors 104 is used to carry or handle signals between an activating device (e.g., activating device 16 of FIG. 1, activating device 46 of FIG. 2 activating device 56 of FIG. 3, activating device 66 of FIG. 4, or activating device 84 of FIG. 5) and a circuit interrupting device or plug assembly.

Figure 7:
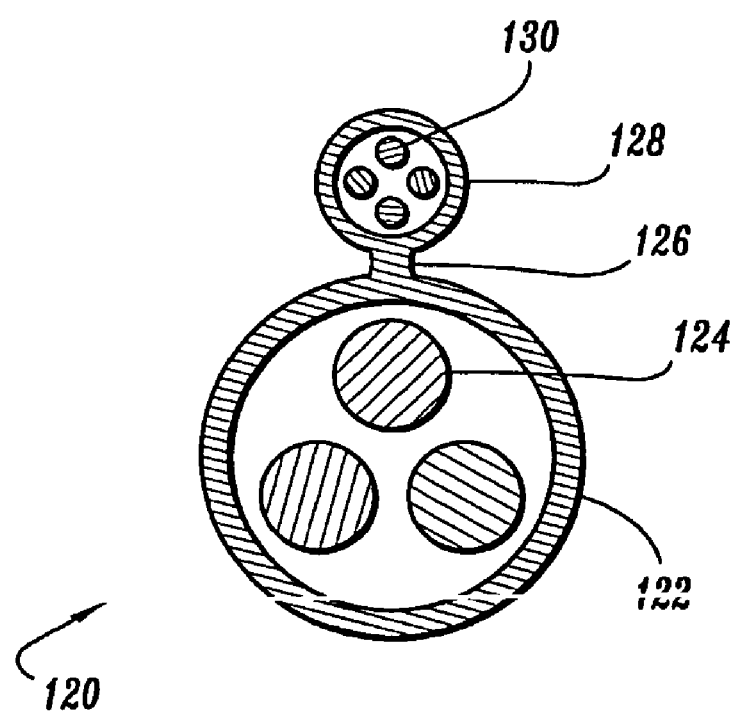

FIG. 7 is a cross-sectional view of another embodiment of a cable that may be used with the various embodiments of a portable circuit interrupting apparatus. In this embodiment, the cable 120 has two components, a power cable 122 and a signal cable 128. The power cable 122 has three power conductors 124 used to carry electrical power. The signal cable 128 has two pairs of signal conductors 130. Each pair of the signal conductors 130 is used to carry or handle signals between an activating device and a circuit interrupting device or plug assembly. Preferably, the power cable 122 is coupled to but electrically isolated from the signal cable 130.

The circuit interrupting devices, plug assemblies and the activating devices described above may include an audio indicator (e.g., buzzer), a visual indicator (e.g., light emitting diodes) or both as indicator means to provide users with an indication of the status of the circuit interrupting device.

While there have been shown and described various features and embodiments of a portable circuit interrupting assembly, it will be understood that various omissions and substitutions and changes of the form and details of the devices illustrated and in their operation may be made by those skilled in the art without departing from the spirit of the subject matter of the present disclosure.

What is claimed is:

1. A portable circuit interrupting apparatus comprising:

a plug having prongs;

a connector for releasable connection to another electronic component;

a circuit interrupting device connected between said plug and said connector, the circuit interrupting device being configured to change from a reset state to a trip state upon the occurrence of a predetermined condition, the circuit interrupting device including test circuitry comprising a test button and configured to cause the circuit interrupting device to change from the reset state to the trip state when activated, and reset circuitry comprising a reset button configured to cause the circuit interrupting device to change from the tripped state to the reset state when activated;

a power cable coupled to said circuit interrupting device, said plug and said connector, with said circuit interrupting device being disposed between said plug and said connector, said power cable having an outer sheathing enclosing at least one power conductor and at least one signal conductor for remotely activating said test circuitry and remotely activating said reset circuitry; and at least one remote activating device having a test button and a reset button and coupled to said at least one signal conductor via said power cable and capable of remotely activating said test circuitry or said reset circuitry of said circuit interrupting device via said at least one signal conductor wherein said circuit interrupting device in communication with said at least one remote activating device, results in a portable circuit interrupting device that can be tested and reset via at least two different devices in at least two different locations.

2. The portable circuit interrupting apparatus according to claim 1, wherein said power cable further comprises at least one additional power conductor and at least one additional signal conductor wherein said at least one remote activating device sends signals across said at least one signal conductor to remotely activate said test circuitry or said reset circuitry.

3. The portable circuit interrupting apparatus according to claim 1, wherein said at least one signal conductor, comprises a pair of signal conductors wherein said at least one remote activating device sends signals through said pair of signal conductors to remotely activate the test circuitry or the reset circuitry.

4. The portable circuit interrupting apparatus according to claim 1, wherein said at least one remote activating device comprises two remote activating devices, wherein one remote activating device is hard wired to the circuit interrupting device and activates the test circuitry or the reset circuitry by sending a signal along the hard wire to the circuit interrupting device, and wherein the other remote activating device is a wireless activating device that activates the test circuitry or the reset circuitry by transmitting a wireless signal to the circuit interrupting device.

5. A portable circuit interrupting apparatus comprising:

a plug having prongs;

a circuit interrupting device connected to the plug and configured to change from a reset state to a trip state upon the occurrence of a predetermined condition, the circuit interrupting device including test circuitry including a test button, said test circuitry configured to cause the circuit interrupting device to change from the reset state to the trip state when activated, and reset circuitry including a reset button, said reset circuitry configured to cause the circuit interrupting device to change from the tripped state to the reset state when activated; and at least one remote activating device having a test button and a reset button and having a wireless transmitter and being in communication with the circuit interrupting device and capable of remotely activating the test circuitry or the reset circuitry, wherein said circuit interrupting device in communication with said remote activating device results in a portable circuit interrupting device that can be tested and reset via at least two different devices in at least two different locations.

6. The portable circuit interrupting apparatus according to claim 5, wherein said wireless transmitter transmits radio frequency communications.

7. The portable circuit interrupting apparatus according to claim 5, wherein said wireless transmitter transmits infrared communications to the circuit interrupting device.

8. The portable circuit interrupting apparatus according to claim 5, wherein the at least one remote activating device comprises two remote activating devices, wherein one remote activating device is operatively coupled to the circuit interrupting device by hard wire and activates the test circuitry or the reset circuitry by sending a signal along the hard wire to the circuit interrupting device, and wherein the other remote activating device is operatively coupled to the circuit interrupting device by wireless communications and activates the test circuitry or the reset circuitry by transmitting a wireless signal to the circuit interrupting device.

9. A portable circuit interrupting apparatus comprising:
a plug disposed in a housing with a circuit interrupting device disposed therein and prongs coupled to said housing, said circuit interrupting device being configured to change from a reset state to a trip state upon the occurrence of a predetermined condition, the circuit interrupting device including test circuitry including a test button, said test circuitry configured to cause the circuit interrupting device to change from the reset state to the trip state when activated, and reset circuitry including a reset button, said reset circuitry configured to cause the circuit interrupting device to change from the tripped state to the reset state when activated;

at least one remote activating device having at least one test button and at least one reset button and capable of remotely activating the test circuitry or reset circuitry; and a cable, connecting said remote activating device with said circuit interrupting device, said cable including at least one power conductor and at least one pair of signal conductors enclosed together in a cable sheath, wherein said at least one pair of signal conductors are connected at one end to said remote activating device and at a second end to said circuit interrupting device so that said at least one pair of signal conductors conduct signals from said at least one remote activating device to said circuit interrupting device to remotely activate either said test circuitry or said reset circuitry wherein said circuit interrupting device is testable and resettable via at least two different devices in at least two different locations.

10. The portable circuit interrupting apparatus according to claim 9, further comprising a connector for releasable connection to another electrical device, said connector being connected to the plug by said cable.

11. The portable circuit interrupting apparatus according to claim 10, wherein the at least one remote activating device is located in the connector comprising a female receptacle.

12. The portable circuit interrupting apparatus according to claim 9, further comprising at least one remote activating device comprising a wireless activating device that activates the test circuitry or the reset circuitry by transmitting a wireless signal to the circuit interrupting device.

13. The portable circuit interrupting apparatus according to claim 10, further comprising a splitter for splitting said cable into three ports wherein a first port of said splitter extends to said plug, a second port of said splitter extends to said connector, and a third port of said splitter extends to said at least one remote activating device.

14. The portable circuit interrupting apparatus according to claim 10, wherein said at least one remote activating device is disposed in a housing having eyelets for fixing said at least one remote activating device to a wall.

15. A portable circuit interrupting apparatus comprising:
plug means having prongs for connecting to a source of electrical power;
connector means for providing electrical power to a load;
circuit interrupting means connected between the plug means and the connector means, and having at least two states, a reset state permitting electrical power from the plug means to flow to the connector means, and a tripped state preventing electrical power from the plug means to flow to the connector means upon the occurrence of a predetermined condition, the circuit interrupting means including test circuitry including a test button, said test circuitry configured to cause the circuit interrupting means to change from the reset state to the trip state when activated, and reset circuitry including a reset button, said reset circuitry configured to cause the circuit interrupting means to change from the tripped state to the reset state when activated; and remote activating means for remotely activating the test circuitry or the reset circuitry said remote activating means comprising a test button and a reset button such that when said test button is pressed, it remotely activates said test circuitry, and wherein when said reset button is pressed, it remotely activates said reset circuitry; and a cable, connecting said remote activating means with said circuit interrupting means, said cable including a sheath enclosing at least one power conductor and at least one pair of signal conductors wherein said at least one pair of signal conductors are connected at one end to said remote actuating means and at a second end to said circuit interrupting means.

16. The portable circuit interrupting apparatus according to claim 15, further comprising at least one additional remote activating means which comprises a wireless activating device that activates the test circuitry or the reset circuitry by transmitting a wireless signal to the circuit interrupting means.

17. A portable cable comprising:
a) a cable having a sheath for enclosing at least one power conductor and at least one signal conductor, said cable having a first end and a second end, said first end having a connector, and said second end having a connector;
b) a first housing coupled to said cable;
c) a circuit interrupting device disposed in said first housing said circuit interrupting device being hard wired to said cable and configured to change from a reset state to a trip state upon the occurrence of a predetermined condition, the circuit interrupting device including test circuitry configured to cause the circuit interrupting device to change from the reset state to the tripped state when activated, and reset circuitry configured to cause the circuit interrupting device to change from the tripped state to the reset state when activated;

d) a test button disposed in said first housing, said test button coupled to said test circuitry of said circuit interrupting device;

e) a reset button disposed in said first housing, said reset button being coupled to said reset circuitry of said circuit interrupting device;

f) a second housing coupled to said cable; and g) at least one remote activating device being disposed in said second housing, said at least one remote activating device being hard wired to said cable and having at least one test button and at least one reset button such that when said at least one test button is pressed, a signal is sent from said second housing to said first housing via said signal conductor to remotely activate said test circuitry in said first housing.

18. The cable as in claim 17, wherein said second housing is spaced apart from said first housing by a length of said cable line.

19. The cable as in claim 17, wherein said first housing houses said connector of said first end, wherein said first end connector is a plug, having prongs extending out from said first housing.

20. The cable as in claim 17 wherein said second housing houses said connector of said second end, wherein said second end connector is a female receptacle forming openings in said second housing for receiving prongs.

* * * * *